(12) United States Patent
Takahara et al.

(10) Patent No.: US 6,876,537 B2
(45) Date of Patent: Apr. 5, 2005

(54) CERAMIC ELECTRONIC COMPONENT AND METHOD FOR MANUFACTURING THE SAME

(75) Inventors: Norihisa Takahara, Ibaraki (JP); Emiko Igaki, Amagasaki (JP); Masakazu Tanahashi, Osaka (JP); Takafumi Moriyasu, Neyagawa (JP); Rui Nakao, Ikoma (JP); Tomoyuki Washizaki, Miyazaki (JP); Yoshiaki Fukui, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/639,920

(22) Filed: Aug. 13, 2003

(65) Prior Publication Data

US 2004/0047104 A1 Mar. 11, 2004

Related U.S. Application Data

(62) Division of application No. 10/181,130, filed as application No. PCT/JP01/02970 on Apr. 5, 2001, now Pat. No. 6,721,166.

(51) Int. Cl.[7] .................................................. H01G 4/06
(52) U.S. Cl. ................................. 361/321.2; 361/306.3; 361/303
(58) Field of Search ............... 361/311–313, 321.2–321, 361/306.3, 322, 321.3, 321.4; 29/25.41, 25.42

(56) References Cited

U.S. PATENT DOCUMENTS

| 5,331,504 A | 7/1994 | Kamiya et al. |
| 5,405,707 A | 4/1995 | Tani et al. |

FOREIGN PATENT DOCUMENTS

| JP | 62-2612 | | 1/1987 |
| JP | 10-92644 | * | 4/1988 |
| JP | 64-61904 | | 3/1989 |
| JP | 5-182862 | | 7/1993 |
| JP | 10-92644 | | 4/1998 |
| JP | 10-214741 | | 8/1998 |
| JP | 11-233368 | | 8/1999 |
| JP | 11-0670 | | 4/2001 |

* cited by examiner

*Primary Examiner*—Anthony Dinkins
(74) *Attorney, Agent, or Firm*—Merchant & Gould P.C.

(57) ABSTRACT

A ceramic electronic component includes two or more electrodes 5 and 6 spaced at a predetermined distance from each other, between which a potential difference is produced in operation and a void 9 that penetrates to the outside is provided. In the void 9, a water repellent film 10 is formed. This prevents water vapor from being absorbed in the void 9 connecting the electrodes 5 and 6, and thereby preventing the formation of a conductive path and the occurrence of ion migration.

15 Claims, 10 Drawing Sheets

CERAMIC ELECTRONIC COMPONENT AND METHOD FOR MANUFACTURING THE SAME

TECHNICAL FIELD

The present invention relates to a ceramic electronic component such as a chip inductor, a ceramic capacitor, and an inductance-capacitance (LC) composite component and a method for manufacturing the ceramic electronic component.

BACKGROUND ART

In recent years, electronic equipment has been miniaturized and improved in portability. This has created a growing demand for size and weight reduction of various kinds of electronic components to be housed in the electronic equipment. Accordingly, the electronic equipment has been used in diversified environments, and thus a demand for high reliability with respect to the diversified environments also has been growing.

Against the foregoing background, conventionally, ceramic electronic components have presented a problem of ion migration under high humidity.

Ceramic electronic components are obtained by sintering particles of the micron orders or the submicron orders. Therefore, a sintered body thus obtained may have many minute holes, namely, pores on the surface or in the inner portion. Because of this, when a ceramic electronic component is allowed to stand under high humidity, water vapor penetrates into open pores in an inner portion of a ceramic sintered body, which are open to the surface of the ceramic sintered body. In a pore having a sufficiently small diameter, capillary condensation results in condensing of the water vapor. Among the open pores are open penetrating pores that penetrate between electrodes provided so as to sandwich a ceramic layer therebetween. When a voltage is applied between the electrodes in a state where water droplets obtained as a result of condensation in the open penetrating pores establish a connection between the electrodes, that is, a conductive path is formed by condensation water, an electrode metal represented by an Ag electrode is ionized to cause ion migration. When the ion migration is caused, for example, in the case of a ceramic capacitor, the insulation resistance between electrodes is lowered to cause degradation in electrical characteristics. This problem arises not only in a component with open pores but also in a component with a void (defect) portion that extends from the outside to an area between electrodes.

Conventionally, the following techniques have been adopted to suppress this ion migration, i.e. a technique in which the entire surface of a ceramic sintered body is coated with a synthetic resin, or a technique in which all the pores on the surface of a ceramic sintered body are closed with a synthetic resin or glass.

However, coating the entire surface of the ceramic sintered body with the synthetic resin only serves to retard the penetration of water vapor into open penetrating pores. When allowed to stand under high humidity for a long time, the water vapor diffuses through the synthetic resin to penetrate into the open penetrating pores. Then, the water vapor is condensed by capillary condensation. This phenomenon is accelerated and thus becomes likelier to cause condensation under high temperatures and humidity. Water droplets obtained as a result of the condensation form a conductive path between electrodes to cause ion migration, thereby causing variations in electrical characteristics of a ceramic electronic component, which has been disadvantageous.

On the other hand, when all the pores on the surface of the ceramic sintered body are closed, the synthetic resin and the glass are used in the following manners, respectively. In the case of using the synthetic resin, a technique is employed in which the ceramic sintered body is impregnated with a mixed solution of a resin and a solvent and then cured. In the case of using the glass, a technique is employed in which a glass paste is printed and baked. When these techniques are employed, cross-linking or curing of the synthetic resin is caused, or the glass is reduced in volume when melted and sintered. This makes it very difficult to close all the pores. Even when all the pores are closed successfully, it is impossible to fill the entire space in the pores. Instead, voids are formed in the pores, or the pores are coated with a film. In this case, water vapor penetrates into the pores via the voids or is diffused to permeate through the coating film into the pores in an inner portion of the ceramic sintering body. In some cases, when allowed to stand under high humidity for a long time, the water vapor is condensed in the inner portion, so that a conductive path is formed between electrodes to cause ion migration, which has been disadvantageous.

In order to form the synthetic resin and the glass so that no voids are formed in the space in the pores, a method also is employed in which a synthetic resin component of the solution with which the ceramic sintered body is impregnated and a glass component of the glass paste are increased in concentration. However, with increased concentration, the solution and the glass paste are increased in viscosity. This makes it very difficult to impregnate all the pores on the surface of the ceramic sintered body with the solution and the glass paste. Even when the solution is allowed to permeate through all the pores on the surface of the ceramic sintered body successfully, it is impossible to allow the solution to permeate through the pores in the inner portion of the sintered body. As described above, when a technique is limited to a simple process in which all the pores on the surface of the ceramic sintered body are closed with the synthetic resin, water vapor is diffused through the synthetic resin to penetrate into the inner portion of the ceramic sintered body. This causes ion migration, thereby causing variations in electrical characteristics, which has been disadvantageous. On the other hand, when the entire surface of a ceramic sintered body is coated with glass completely, while water diffusion and penetration can be prevented, diffusion of the glass into ceramic is caused when the glass is baked, thereby causing variations in characteristics. Because of this, in many cases, this technique cannot be employed from a structural standpoint.

DISCLOSURE OF THE INVENTION

In order to solve the conventional problem, the present invention is to provide a ceramic electronic component that allows the occurrence of ion migration to be prevented even when allowed to stand under high humidity for a long time, thereby preventing the degradation of electrical characteristics caused by the ion migration.

In order to achieve the aforementioned object, a ceramic electronic component of the present invention includes two or more electrodes spaced at a predetermined distance from each other, between which a potential difference is produced in operation and a void that communicates with the outside is provided. In the void, a water repellent film is formed.

Furthermore, a method for manufacturing the ceramic electronic component of the present invention is a method for manufacturing a ceramic electronic component including two or more electrodes spaced at a predetermined distance from each other, between which a potential difference is produced in operation and a void that communicates with the outside is provided. In the method, a coupling agent containing fluorine is brought into contact with the void, and then dried to be heat-treated.

According to the present invention, capillary condensation is not caused between electrodes, which is caused generally due to high humidity, and thus a water path, namely, a conductive path in which ions can migrate is not formed between the electrodes even when condensation is caused compulsorily due to a temperature difference, thereby allowing the prevention of ion migration.

BEST MODE FOR CARRYING OUT THE INVENTION

In the present invention, the water repellent film may be formed only in an area between the two or more electrodes, or in all the voids in an inner portion of the ceramic sintered body. In the case of forming the water repellent film only in the area between the two or more electrodes, the water repellent film can be formed, for example, in the following manner. The electronic component is immersed in a solution containing a coupling agent that will be described later. Then, the coupling agent in a surface layer portion is cleaned with a solution so as to be removed. This is followed by a drying process and heat treatment. In the case of forming the water repellent film in all the voids in the inner portion of the ceramic sintered body, the water repellent film can be formed by omitting the process step of cleaning the surface layer portion.

The water repellent film is formed of a residue resulting from a molecule of the coupling agent. Preferably, the water repellent film has such a thickness as not to narrow an inner portion of the void by not less than 1 nm. By a water repellent treatment, migration caused by water is reduced. Preferably, the molecule of the coupling agent is bonded to a ceramic base material by a covalent bond. By the covalent bond, when seen from a chemical aspect, water repellency can be maintained stably for a long time.

Furthermore, preferably, the molecule of the coupling agent has a portion containing a fluoroalkyl group. Preferably, the molecule of the coupling agent is formed, for example, of a residue of perfluoroalkyl alkylsilane represented by the following general formula (Chemical Formula 1):

$$CF_3-(CF_2)_n-R-Si(O-)_3 \qquad \text{(Chemical Formula 1)}.$$

(n: 0 or an integer, R: a substituent containing an alkylene group, or a Si or oxygen atom)

The molecule of the coupling agent containing the fluoralkyl group may be bonded to the base material in the form of a single molecule. Preferably, the molecule of the coupling agent is bonded to the base material in the form of a polymer. By polymerization, density is increased and water repellency is enhanced.

Ceramic electronic components have been smaller and more compact, and thus microscopic defects are likely to be caused. However, such defects can be prevented by forming the water repellent film of the present invention. The water repellent film can be applied, for example, to an electronic component in which a ceramic formed body is formed by printing and sintered. Further, the water repellent film can be applied to an electronic component in which ceramic formed into a sheet and an electrode layer are laminated alternately and sintered. Furthermore, the water repellent film can be applied to an electronic component in which a ceramic layer is formed by vapor deposition, sputtering, or the like. Moreover, the water repellent film can be applied to an electronic component in which the two or more electrodes are buried in an inner portion of a ceramic sintered body or integrated on the surface of the ceramic sintered body. The electronic component may be a thick film ceramic electronic component including a ceramic layer that is formed as a thick film on a base material, and at least two electrodes. Further, the electronic component may be a composite inductor component including a ceramic sintered body and at least two conductive circuits. Furthermore, the electronic component may be a multilayer ceramic capacitor, a varistor, a semiconductive ceramic capacitor, a ceramic thermistor, an inductor array, a common-mode choke coil, a micro-transformer, and a ceramic electronic substrate housing at least one selected from these components.

In the method of the present invention, preferably, the coupling agent is formed of perfluoroalkyl alkylsilane containing a fluoroalkyl group, which is represented by the following general formula (Chemical Formula 2):

$$CF_3—(CF_2)_n—R—SiY_q(OA)_{3-q} \quad \text{(Chemical Formula 2)}.$$

(n: 0 or an integer, R: a substituent containing an alkylene group, or a Si or oxygen atom, Y: a substituent of an alkyl group, OA: an alkoxy group, q: 0, 1, or 2) The following description is directed to the case where a compound represented by the above general formula (Chemical Formula 2) is, for example, $CF_3—CH_2—O—(CH_2)_{15}—Si(OCH_3)_3$ (Chemical Formula 3). An electronic component of a ceramic base material is formed of an oxide, and thus active hydrogen exists on the surface of the electronic component. Therefore, when the compound represented by (Chemical Formula 3) is brought into contact with a void of the base material and heated, the compound in the form of $CF_3—CH_2—O—(CH_2)_{15}—Si(O—)_3$ (Chemical Formula 4) is bonded to the base material by the covalent bond as a result of a dealcoholation reaction. In some cases, $—Si(O—)_3$ is cross-linked between molecules. Thus, a polymer is likely to be formed.

Preferably, the heat treatment described above is performed at a temperature of 100 to 200° C. for 5 to 60 minutes.

Furthermore, the coupling agent containing fluorine may be brought into contact with the void by any of the following methods, i.e. vapor contact, immersion under atmospheric pressure, immersion under a reduced pressure, immersion under reduced and increased pressures, spray coating, or the like. In practice, it is preferable that the coupling agent is diluted with a solvent.

Preferably, the perfluoroalkyl alkylsilane represented by the general formula (Chemical Formula 2) is at least one selected from the following compounds.

$$CF_3(CF_2)_5(CF_2)_2Si(OCH_3)_3 \quad (1)$$

$$CF_3(CF_2)(CF_2)_2Si(OCH_3)_3 \quad (2)$$

$$CF_3CH_2O(CF_2)_{15}Si(OCH_3)_3 \quad (3)$$

$$CF_3(CF_2)_2Si(CH_3)_2(CF_2)_{15}Si(OCH_3)_3 \quad (4)$$

$$CF_3(CF_2)_3(CF_2)_2Si(CH_3)_2(CF_2)_9Si(OCH_3)_3 \quad (5)$$

$$CF_3COO(CF_2)_{15}Si(OCH_3)_3 \quad (6)$$

$$CF_3(CF_2)_5(CF_2)_2Si(OC_2H_5)_3 \quad (7)$$

$$CF_3(CF_2)_7(CF_2)_2Si(CH_3)_2(CF_2)Si(OC_2H_5)_3 \quad (8)$$

$$CF_3(CF_2)_7(CF_2)_2Si(CH_3)_2(CF_2)_6Si(OC_2H_5)_3 \quad (9)$$

$$CF_3(CF_2)_7(CF_2)_2Si(OC_2H_5)_3 \quad (10)$$

$$CF_3CH_2O(CF_2)_{15}Si(OC_2H_5)_3 \quad (11)$$

$$CF_3COO(CF_2)_{15}Si(OC_2H_5)_3 \quad (12)$$

Hereinafter, the present invention will be described by way of embodiments with reference to appended drawings.

Embodiment 1

Figure 3:
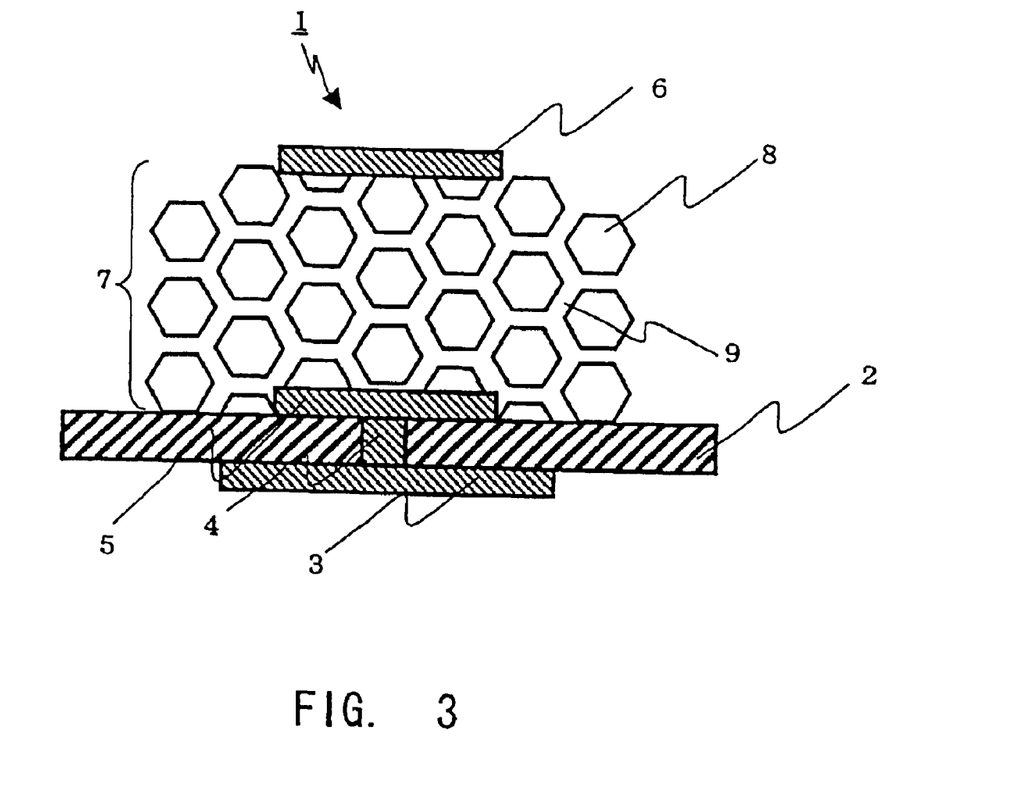
FIG. 3 is a schematic sectional view of the thick film ceramic capacitor on the alumina substrate according to the embodiment of the present invention.

FIG. 3 is a schematic sectional view of a thick film ceramic capacitor 1 formed on an alumina substrate. In the figure, reference numerals 2, 3, and 4 denote an alumina substrate, a rear surface electrode, and a through hole, respectively. Further, reference numerals 5, 6, and 7 denote a front surface electrode (a bottom surface electrode), a top surface electrode, and a dielectric layer, respectively. In the dielectric layer 7, there are provided a sintered network 8 of ceramic and open penetrating pores 9 that extend to the surface of a ceramic sintered body and between the bottom surface electrode 5 and the top surface electrode 6.

Figure 4A:
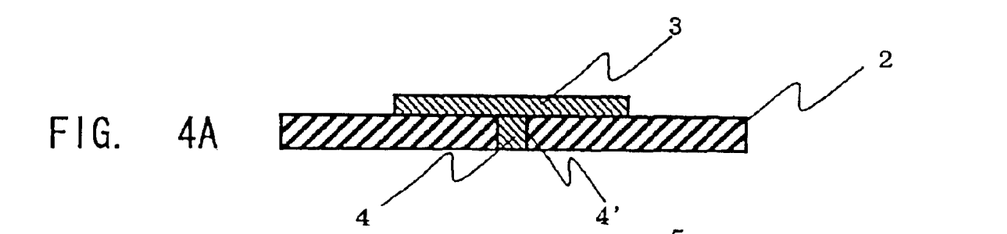
FIGS. 4A to 4D are schematic sectional views showing process steps in a method for manufacturing the thick film ceramic capacitor on the alumina substrate according to the embodiment of the present invention.
Figure 4B:
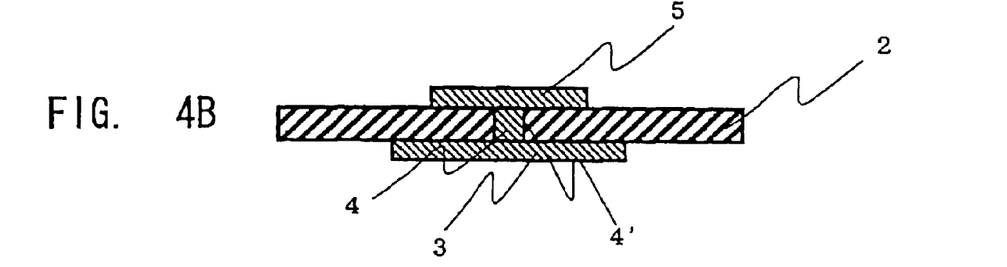
Figure 4C:
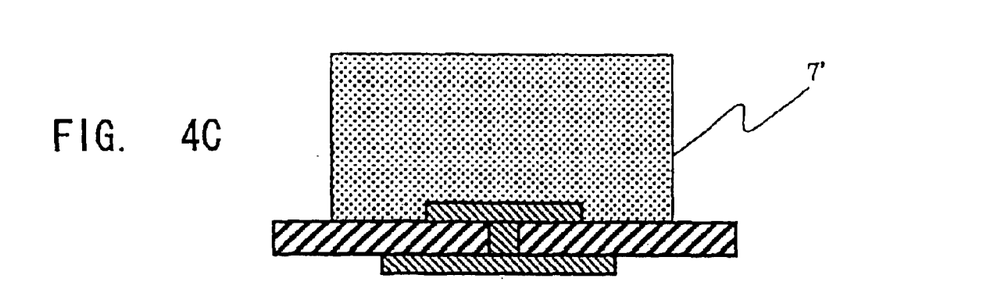
Figure 4D:
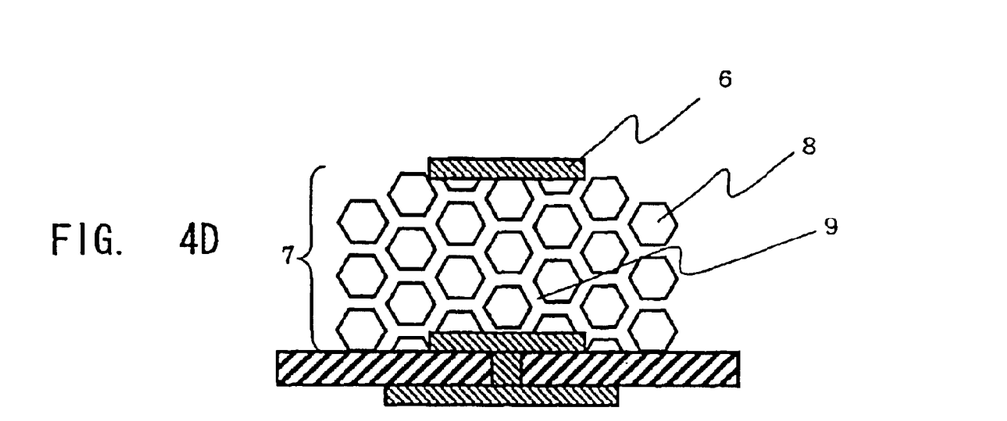

In the following description, a method for manufacturing the thick film ceramic capacitor on the alumina substrate configured as described above is explained with reference to the appended drawings. FIGS. 4A to 4D are diagrams showing process steps in a method for manufacturing the thick film ceramic capacitor on the alumina substrate. Initially, as shown in FIG. 4A, a paste mainly containing Ag is printed by screen printing on the alumina substrate 2 provided with a through hole 4' and heat-treated to form the rear surface electrode 3 having a thickness of 5 μm. Concurrently with this, the through hole 4' also is filled with Ag to form an electrode 4. Then, as shown in FIG. 4B, a paste mainly containing Ag is printed by the screen printing on a surface opposed to the surface on which the rear surface electrode 3 is printed and heat-treated to form the front surface electrode (the bottom surface electrode) 5 having a thickness of 5 μm. After that, as shown in FIG. 4C, a dielectric paste 7' is printed by the screen printing and dried. Finally, on top of the dielectric paste that has been dried, a paste mainly containing Ag and Pd is printed by the screen printing and heat-treated to form the top surface electrode 6 having a thickness of 5 μm and the dielectric layer 7 having a thickness of 30 μm between the bottom surface electrode 5 and the top surface electrode 6. The aforementioned process steps allow the thick film ceramic capacitor 1 as shown in FIG. 4D to be obtained.

In the thick film ceramic capacitor manufactured as described above, the electrodes are formed of Ag, and thus in forming the dielectric layer 7, firing cannot be performed at a temperature higher than the melting temperature of Ag. Therefore, sintering of the dielectric layer 7 is hindered, so that in an inner portion of the dielectric layer 7, the sintered network 8 and the open penetrating pores 8 are formed. The sintered network 8 is a network of particles resulting from sintering caused among the particles.

Figure 1:
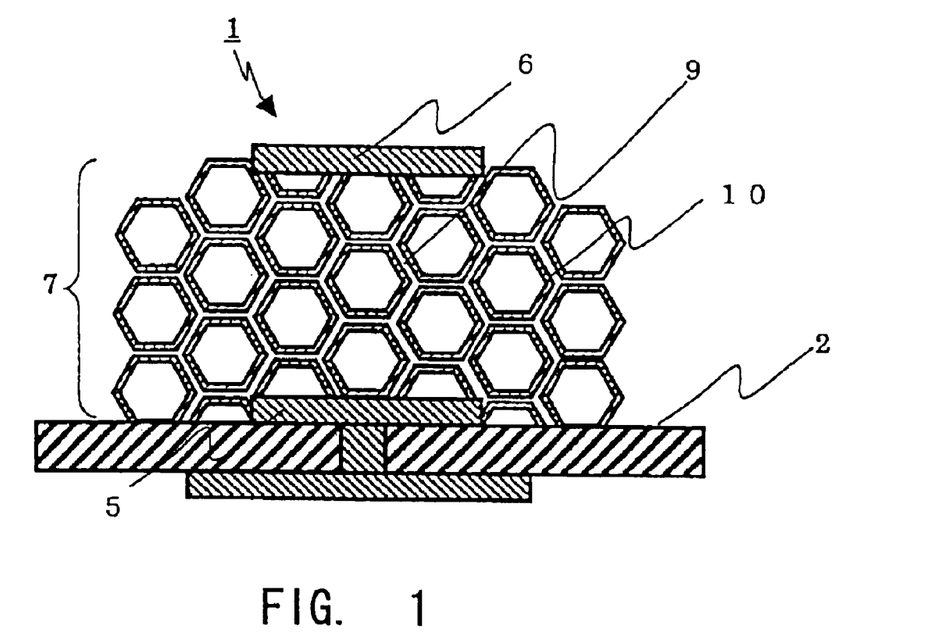
FIG. 1 is a schematic sectional view of a thick film ceramic capacitor on an alumina substrate according to an embodiment of the present invention, in which a water repellent film is formed in an entire ceramic sintered body.
Figure 2:
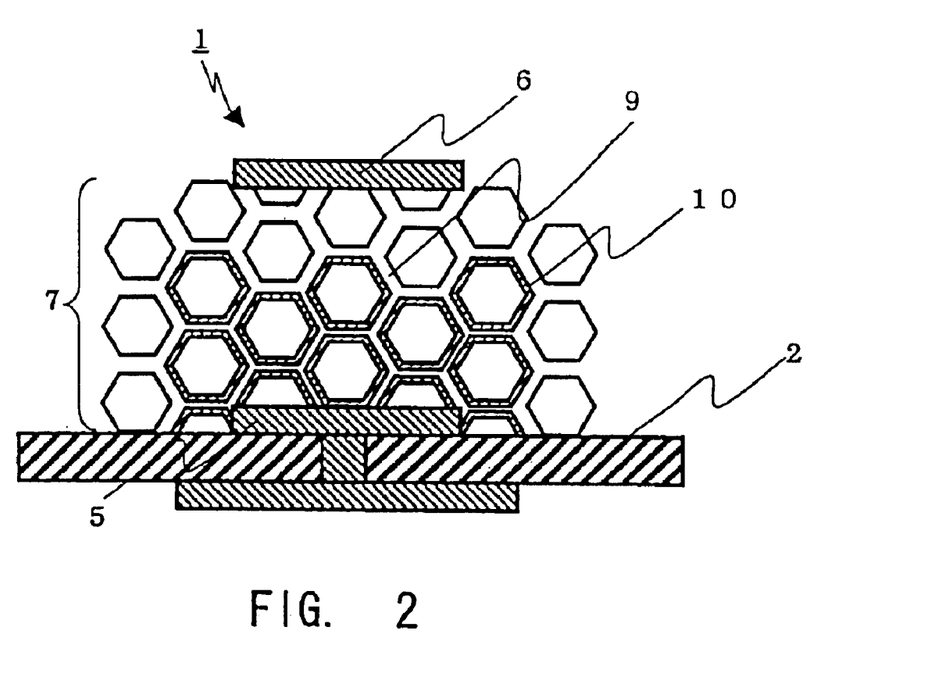
FIG. 2 is a schematic sectional view of the thick film ceramic capacitor on the alumina substrate to show a structure according to the embodiment of the present invention.

FIGS. 1 and 2 are schematic sectional views of the thick film ceramic capacitor 1 as a ceramic electronic element according to an embodiment of the present invention. In FIG. 1, a water repellent film 10 is formed on the ceramic surfaces of all the open penetrating pores 9 in the dielectric layer 7. In FIG. 2, the water repellent film 10 is formed on at least a portion of the ceramic surfaces of all the open penetrating pores 9 connecting the bottom surface electrode 5 with the top surface electrode 6.

In the following description, a method for forming the water repellent film of the thick film ceramic capacitor shown in FIG. 1 will be detailed as an example. Initially, the thick film ceramic capacitor 1 and a silane coupling solution in which a silane coupling agent is dissolved are prepared. The thick film ceramic capacitor is immersed in the silane coupling solution, and an ultrasonic oscillation is applied thereto from the outside so that the silane coupling solution is allowed to permeate through the open penetrating pores 9 in the inner portion of the dielectric layer 7. Then, the thick film ceramic capacitor 1 is pulled out of the silane coupling solution and heat-treated after being air-dried at room temperature for several minutes, so that a condensation reaction of the silane coupling agent is accelerated. This reaction proceeds on a hydrophilic surface, and thus a hydrophobic group derived from the above silane coupling agent is fixed on the ceramic surfaces of the open penetrating pores 9. Thus, as shown in the figures, the water repellent film 10 is formed on the ceramic surfaces of the open penetrating pores 9 as a result of a molecule desorbent reaction of the silane coupling agent. The water repellent film 10 is formed as a film equivalent to a monomolecular layer formed by chemisorption.

In the following description, a method for forming the water repellent film of the thick film ceramic capacitor shown in FIG. 2 will be detailed as an example. The thick film ceramic capacitor 1 and a silane coupling solution in which a silane coupling agent is dissolved are prepared. The thick film ceramic capacitor 1 is immersed in the silane coupling solution, and an ultrasonic oscillation is applied thereto from the outside so that the silane coupling solution is allowed to permeate through the open penetrating pores 9 in the inner portion of the dielectric layer 7. Then, the thick film ceramic capacitor 1 is pulled out of the silane coupling solution. After that, the silane coupling agent in the vicinity of the top surface electrode 6 is cleaned with a solution in which the silane coupling agent can be dissolved so as to be removed. Finally, the thick film ceramic capacitor is heat-treated after being air-dried at room temperature for several minutes, so that a condensation reaction of the silane coupling agent is accelerated.

The aforementioned method allows a water repellent portion to be formed with reliability at least in a part of all the open penetrating pores 9 connecting the top surface electrode 6 with the bottom surface electrode 5, thereby allowing ions to be prevented from migrating when a voltage is applied. In FIG. 2, the coupling agent in the vicinity of the top surface electrode 6 is cleaned to be removed, so that in a later process of finishing for the market, adherence of a coating layer to the top surface electrode 6 and the dielectric layer 7 can be maintained, and inhibition against plating on the electrodes can be prevented.

The water repellent treatment according to the present invention provides ion migration suppressing action that is effective with respect to any electronic component using a metal that is suited for use as an electrode and can be ionized. Particularly, the ion migration suppressing action is effective to an electronic component including an electrode formed of an element such as Ag, Cu, and AgPd.

The following description is directed to examples in which, as shown in FIGS. 1 and 2, the water repellent film 10 is formed on the ceramic surfaces of the open penetrating pores 9 between the top surface electrode 6 and the bottom surface electrode 5.

EXAMPLE 1

As a water repellent agent, a compound represented by the following formula (Chemical Formula 3) of a fluorine coupling agent was prepared:

$CF_3CH_2O(CF_2)_{15}Si(OCH_3)_3$     (Chemical Formula 3).

Then, the compound is diluted with isopropyl alcohol to obtain a silane coupling solution containing 1% by weight of the compound. After that, as described above, the thick film ceramic capacitor shown in FIG. 4D was immersed in the silane coupling solution, and an ultrasonic oscillation (100 W, 45 kHz) was applied thereto for 10 minutes. Finally, the thick film ceramic capacitor was pulled out of the silane coupling solution and heat-treated at a temperature of 150° C. for 30 minutes after being air-dried at room temperature for 10 minutes, so that a condensation reaction of the silane coupling agent was accelerated.

EXAMPLE 2

Following the same procedure as in Example 1, an ultrasonic oscillation (100 W, 45 kHz) was applied to the thick film ceramic capacitor. After the thick film ceramic capacitor was pulled out of the silane coupling solution, the silane coupling agent in the vicinity of the top surface electrode was cleaned with isopropyl alcohol to be removed. Finally, the thick film ceramic capacitor was heat-treated at a temperature of 150° C. for 30 minutes after being air-dried at room temperature for 10 minutes, so that a condensation reaction of the silane coupling agent was accelerated.

COMPARATIVE EXAMPLE 1

FIG. 3 is a schematic sectional view of a thick film ceramic capacitor used as Comparative Example 1. The thick film ceramic capacitor was not subjected to a water repellent treatment.

COMPARATIVE EXAMPLE 2

Figure 5:
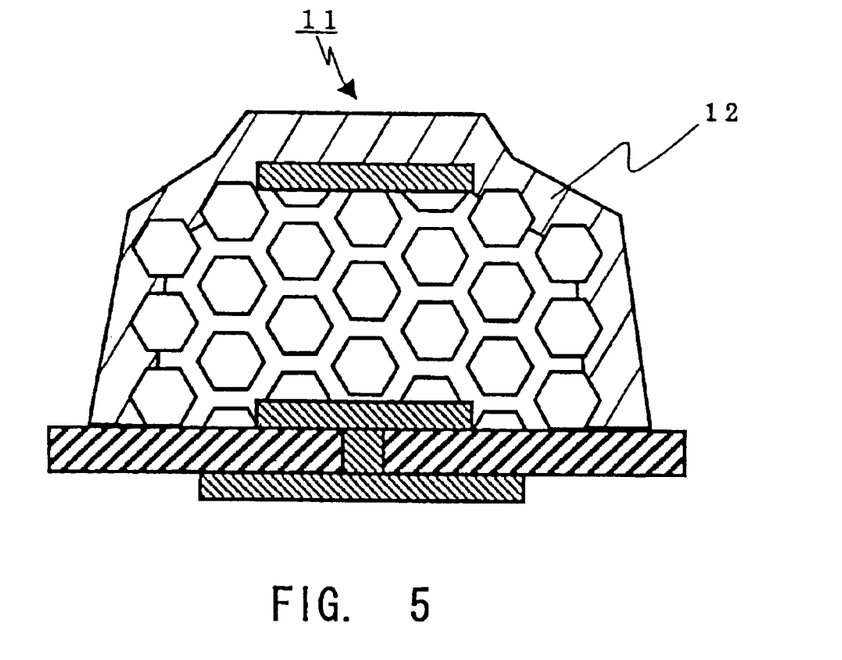
FIG. 5 is a schematic sectional view of Comparative Example 2 in which a thick film ceramic capacitor on an alumina substrate is coated with a phenol resin.

FIG. 5 is a schematic sectional view of a thick film ceramic capacitor used as Comparative Example 2. In the figure, reference numerals 11 and 12 denote a thick film ceramic capacitor and a phenol resin, respectively. Initially, the thick film ceramic capacitor shown in FIG. 4D and the phenol resin were prepared. Then, the phenol resin was printed by screen printing on the thick film ceramic capacitor so that the entire surface of the thick film ceramic capacitor was coated with the phenol resin. Then, the phenol resin was heat-treated at a temperature of 150° C. to be cured, so that a phenol resin layer having a thickness of about 15 μm was formed on the thick film ceramic capacitor.

COMPARATIVE EXAMPLE 3

Figure 6:
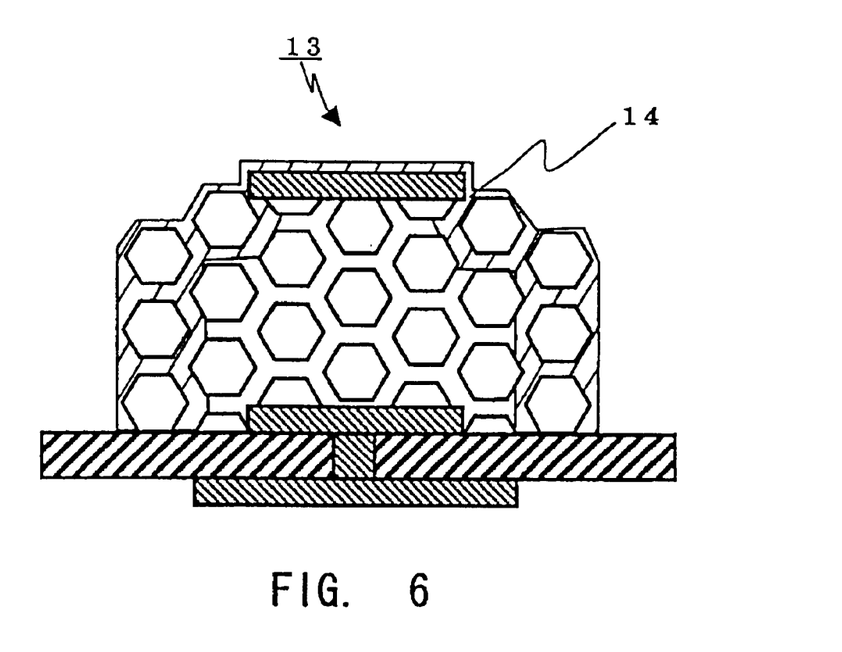
FIG. 6 is a schematic sectional view of Comparative Example 3 in which pores on a surface portion of a thick film ceramic capacitor on an alumina substrate are closed with a silicone resin.

FIG. 6 is a schematic sectional view of a thick film ceramic capacitor used as Comparative Example 3. In the figure, reference numerals 13 and 14 denote a thick film ceramic capacitor and a silicone resin, respectively. Initially, the thick film ceramic capacitor shown in FIG. 4D and a silicone resin dilute solution (a five-fold dilute solution obtained by diluting the silicone resin with silicone oil) were prepared. Then, the thick film ceramic capacitor was immersed in the silicone resin dilute solution, and an ultrasonic oscillation (100 W, 45 kHz) was applied thereto for 10 minutes. After that, the thick film ceramic capacitor was pulled out of the silicone resin dilute solution and heat-treated at a temperature of 300° C. for one hour, so that pores in a surface portion of the thick film ceramic capacitor were closed.

For the respective thick film ceramic capacitors manufactured in Examples 1 and 2, and Comparative Examples 1, 2, and 3, thirty samples were prepared. With respect to these samples, insulation resistance between the top surface electrode 6 and the bottom surface electrode 5 was measured after a voltage of 5 V was applied between the top electrode 6 and the bottom surface electrode 5 for about 500 hours under an atmosphere of a temperature of 60° C. and a relative humidity of 95%. When the insulation resistance was decreased from a pre-test value of not less than $10^{10}$ Ω to not more than $10^8$ Ω, the insulation resistance was regarded as being degraded. The rate of the number of samples in which the insulation resistance degradation was observed is shown in Table 1.

TABLE 1

| Sample | Insulation Resistance Degradation Rate (%) |
|---|---|
| Example 1 | 0 |
| Example 2 | 0 |
| Comparative Example 1 | 60 |
| Comparative Example 2 | 30 |
| Comparative Example 3 | 17 |

As can be seen from Table 1, in Comparative Example 1 in which the water repellent treatment was not performed, the insulation resistance was degraded at a considerably high rate. In Comparative Example 2 in which the entire surface of the thick film ceramic capacitor was coated with the phenol resin, while it was confirmed that the insulation resistance degradation was suppressed to some extent, the insulation resistance could not be suppressed with respect to all the samples. Conceivably, this is attributable to the following. Even when the entire surface of the thick film ceramic capacitor is coated with the phenol resin, water vapor is diffused through the phenol resin and thereby penetrates into the open penetrating pores after a long time. Then, capillary condensation causes condensation of the water vapor. Further, in Comparative Example 3 in which the pores on the surface of the thick film ceramic capacitor are impregnated with the silicone resin to be closed, while a considerable effect of suppressing the insulation resistance degradation was confirmed, the degradation could not be suppressed with respect to all the samples. As in the case of Comparative Example 2, conceivably, this is attributable to the following. Even when the pores in the surface portion of the thick film ceramic capacitor are closed with the silicone resin, water vapor is diffused through the silicone resin to penetrate into the open penetrating pores in the inner portion of the dielectric layer. This results in condensation of the water vapor. It is also conceivable that the concentration of the silicone resin dilute solution was increased to close the pores in the surface portion completely, so that the silicone resin dilute solution did not permeate through the open penetrating pores in the inner portion of the dielectric layer.

On the other hand, in Examples 1 and 2 in which the water repellent film was formed, the insulation resistance degradation could be prevented completely. In the configurations of Examples 1 and 2, the silane coupling agent is diluted to obtain a dilute solution having a very low concentration, and thus the silane coupling solution easily penetrated into the open penetrating pores in the inner portion of the dielectric layer, so that the water repellent film is formed on the ceramic surfaces of the open penetrating pores in the dielectric layer. Further, the water repellent film is only required to prevent a conductive path from being formed due to capillary condensation between the electrodes having different potentials from each other, rather than to fill the open penetrating pores physically. That is, even in a state where voids are formed in the open penetrating pores, the water repellent film performs the function sufficiently.

Conceivably, the aforementioned explains that these configurations serve as effective techniques with respect to ion migration.

Embodiment 2

Figure 12:
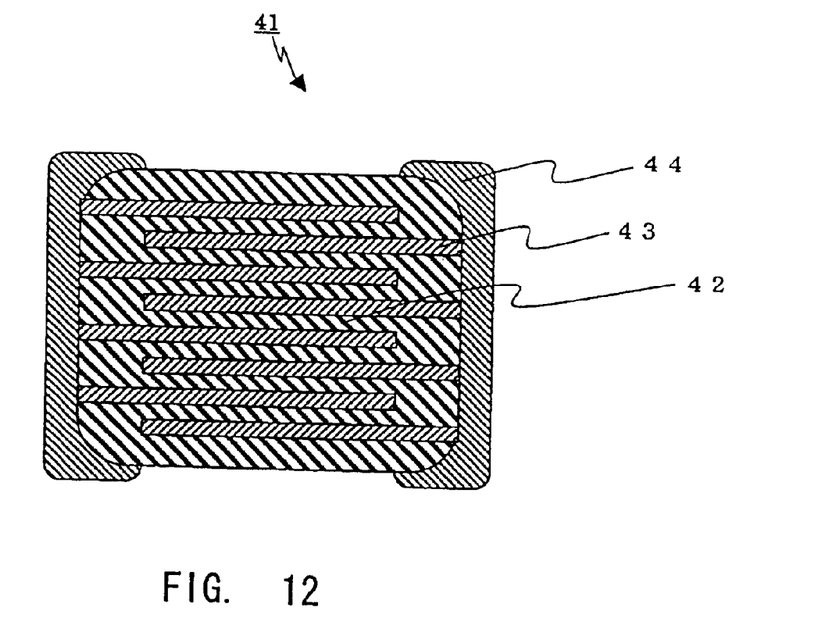
FIG. 12 is a schematic sectional view of a multilayer ceramic capacitor used in an example of the present invention.

FIG. 12 is a schematic sectional view of a multilayer ceramic capacitor 41. In the figure, reference numerals 42, 43, and 44 denote a dielectric layer, an internal electrode, and an external electrode, respectively. Generally, the multilayer ceramic capacitor is formed in the following manner. A dielectric sheet manufactured by a sheet forming method and an internal electrode manufactured by screen printing are laminated alternately to form one body. The body is sintered, and then, an external electrode is formed on the body.

Since the multilayer ceramic capacitor manufactured in the aforementioned manner is obtained by sintering performed at very high temperatures, the dielectric layer is densified, so that almost no voids are formed due to sintering performed in an incomplete manner. However, when the dielectric layer has a portion containing dust or the like before firing, voids (defects) are formed in the portion after the firing.

Figure 13:
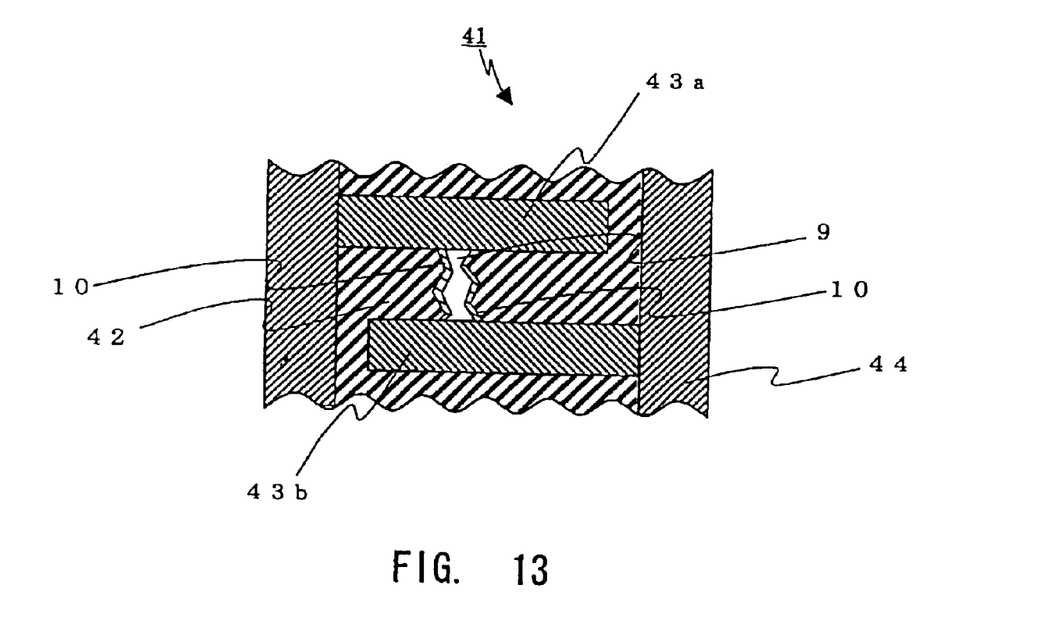
FIG. 13 is an expanded sectional view of a multilayer ceramic capacitor to show a structure according to an embodiment of the present invention.

FIG. 13 is an expanded sectional view of a multilayer ceramic capacitor as a ceramic electronic component according to an embodiment of the present invention. A water repellent film 10 is formed on a ceramic surface of an open penetrating pore 9 connecting internal electrodes 43a and 43b in a dielectric layer 42.

The following description is directed to examples in which, as shown in FIG. 13, the water repellent film 10 is formed on the ceramic surface of the open penetrating pore 9 connecting the internal electrodes 43a and 43b.

EXAMPLE 3

Figure 11:
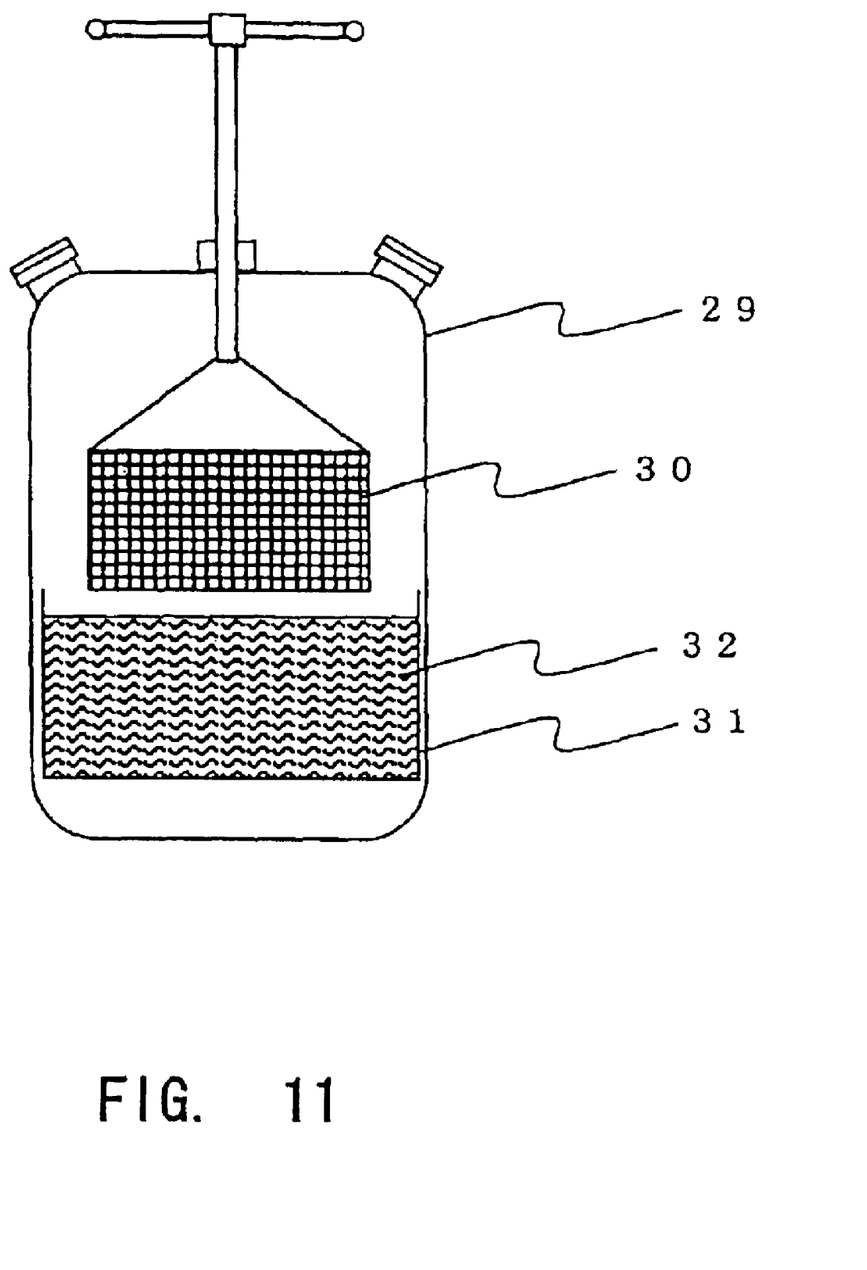
FIG. 11 is a schematic diagram of a vacuum-pressure impregnation device used in Example 3 and for the composite inductor component used in Example 5 of the present invention.

A multilayer ceramic capacitor (rated voltage: 6.3 V, thickness of a dielectric layer: 3 μm, an internal electrode of Ni is used) and as a water repellent agent, a compound represented by the aforementioned formula (Chemical Formula 3) of a fluorine coupling agent were prepared. Then, the compound was diluted with isopropyl alcohol to obtain a silane coupling solution containing 1% by weight of the compound. After that, a vacuum-pressure impregnation device 29 as shown in FIG. 11 was prepared. The multilayer ceramic capacitor was placed in a basket 30 in the vacuum-pressure impregnation device 29. A silane coupling solution 32 was put in a container 31. Then, the vacuum-pressure impregnation device was depressurized (0.1 Torr) to eliminate gas remaining in the silane coupling solution 32 and an inner portion of the multilayer ceramic capacitor. The elimination of the gas was performed for 20 minutes. After that, in a depressurized state, the multilayer ceramic capacitor together with the basket 30 was immersed in the silane coupling solution 32 for 10 minutes. Then, an inner portion of the vacuum-pressure impregnation device 29 was pressurized to obtain an atmospheric pressure by using $N_2$ gas. After that, the vacuum pressure impregnation device 29 was allowed to stand in a pressurized state (5 $kgf/cm^2$) for 30 minutes. Then, the inner portion of the vacuum-pressure impregnation device 29 was depressurized to obtain the atmospheric pressure, and the basket 30 was pulled out of the silane coupling solution 32. Finally, the multilayer ceramic capacitor was taken out of the basket 30 and heat-treated at a temperature of 150° C. for 30 minutes after being air-dried at room temperature for 10 minutes, so that a condensation reaction of the silane coupling agent was accelerated.

EXAMPLE 4

A multilayer ceramic capacitor (rated voltage: 6.3 V, thickness of a dielectric layer: 3 μm, an internal electrode of Ni is used) and as a water repellent agent, a compound represented by the aforementioned formula (Chemical Formula 3) of a fluorine coupling agent were prepared. Then, the multilayer ceramic capacitor and the compound were placed in the same container, and the container was heated so that the temperature in the container was increased to 100° C. and allowed to stand for 30 minutes. This heating process caused vapors to be formed from the silane coupling agent, and the vapors penetrated into open penetrating pores in an inner portion of the multilayer ceramic capacitor. Finally, the multilayer ceramic capacitor was taken out of the container and heat-treated at a temperature of 150° C. for 30 minutes after being air-dried at room temperature for 10 minutes, so that a condensation reaction of the silane coupling agent was accelerated.

COMPARATIVE EXAMPLE 4

A multilayer ceramic capacitor used in this example was the same as those used in Examples 3 and 4. In this example, the multilayer ceramic capacitor was not subjected to a water repellent treatment.

COMPARATIVE EXAMPLE 5

A multilayer ceramic capacitor was subjected to a water repellent treatment in the same manner as in the water repellent treatment performed in Example 1 of Embodiment 1.

For the respective thick film ceramic capacitors manufactured in Examples 3 and 4, and Comparative Examples 4 and 5, thirty samples were prepared. With respect to these samples, insulation resistance was measured after a voltage of 24 V was applied to the samples for 500 hours under an atmosphere of a temperature of 85° C. and a relative humidity of 85%. When the insulation resistance was decreased from a pre-test value of not less than $10^9$ Ω to not more than $10^6$ Ω, the insulation resistance was regarded as being degraded. The rate of the number of samples in which the insulation resistance degradation was observed is shown in Table 2.

TABLE 2

| Sample | Insulation Resistance Degradation Rate (%) |
| --- | --- |
| Example 3 | 0 |
| Example 4 | 0 |
| Comparative Example 4 | 7 |
| Comparative Example 5 | 7 |

As can be seen from Table 2, in Comparative Example 4 in which the water repellent treatment was not performed, the insulation resistance was degraded. Further, in Comparative Example 5 in which the water repellent treatment was performed by using an ultrasonic oscillation, the insulation resistance also was degraded. Conceivably, this is attributable to the following. The dielectric layer of the multilayer ceramic capacitor was obtained by firing performed so that the dielectric layer was highly densified. Therefore, applying the ultrasonic oscillation alone was not sufficient to allow the silane coupling solution to permeate through defects in an inner portion of the dielectric layer. On the contrary, in Example 3 in which vacuum-pressure impregnation was performed, and in Example 4 in which vapor impregnation was performed, the insulation resistance was not degraded. In Comparative Examples 4 and 5, upon analysis of the samples in which the insulation resistance was degraded, it was found that a metal portion formed by migration was present in defect portions. On the contrary, in Examples 3 and 4, it was confirmed that the defect portions were present without including the metal portion. This explains that the present invention gives the effect of preventing migration caused in a ceramic electronic component including a defect portion, even when the ceramic electronic component is highly densified by sintering as in a multilayer ceramic capacitor.

Embodiment 3

Figure 7:
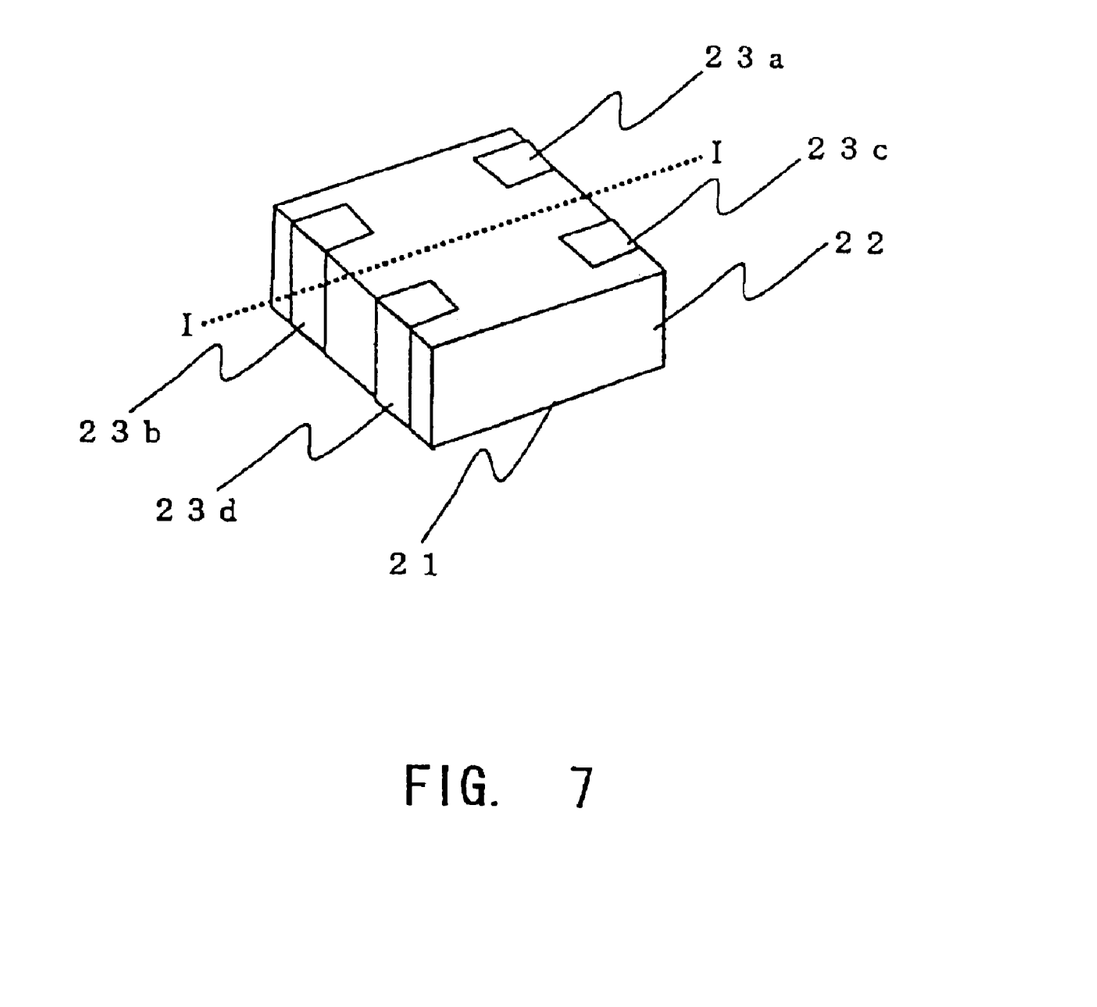
FIG. 7 shows a perspective view of a composite inductor component used in Example 5 of the present invention.

FIG. 7 shows the appearance in perspective of a composite inductor component. A composite inductor component 21 is composed of a ferrite sintered body 22, and external electrodes 23a, 23b, 23c, and 23d.

Figure 8:
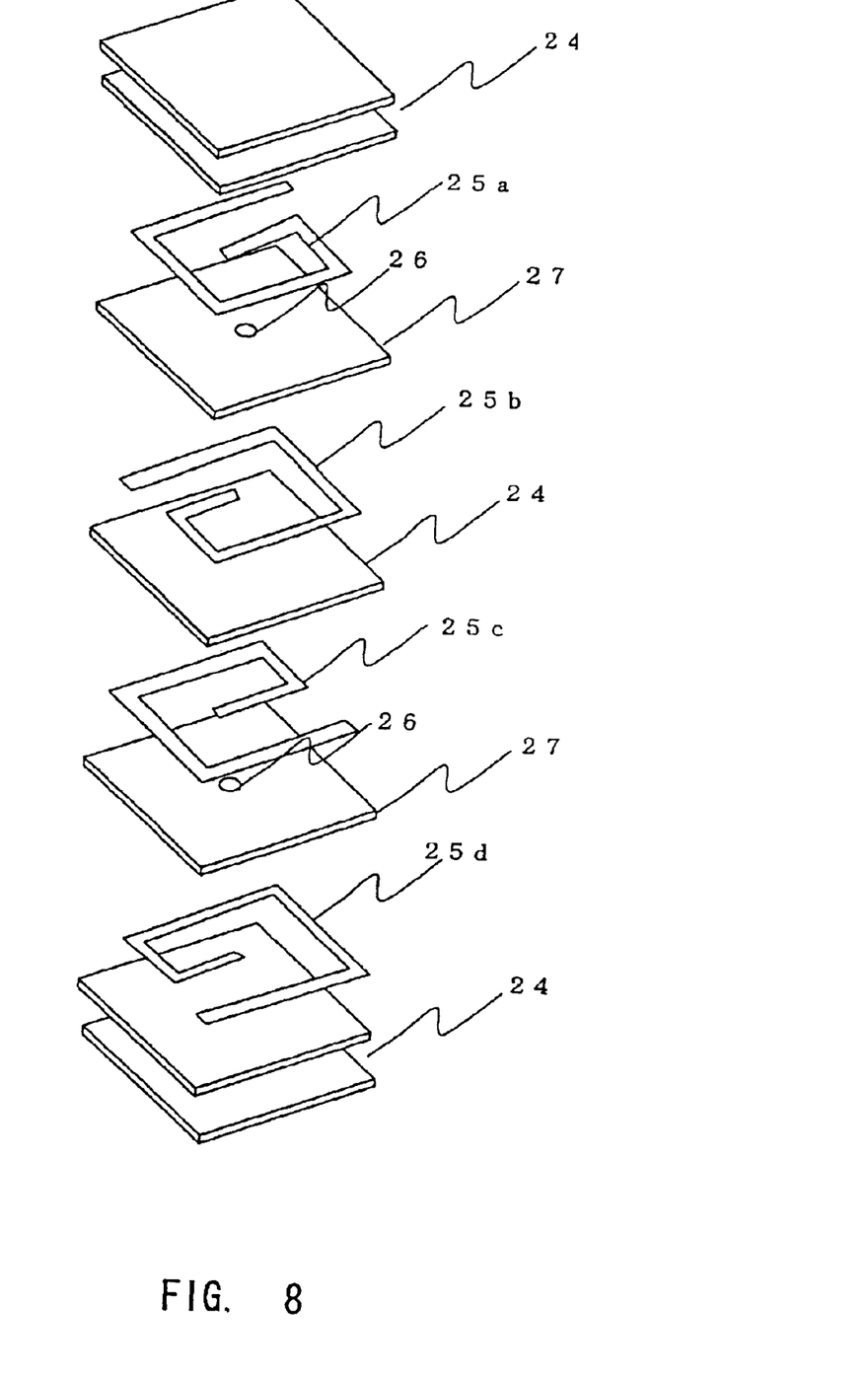
FIG. 8 is an exploded perspective view of the composite inductor component used in Example 5 of the present invention.

FIG. 8 is an exploded view in perspective of the composite inductor component (the external electrodes 23a, 23b, 23c, and 23d are not shown). In the figure, reference numeral 24 denotes a first ferrite sheet. Further, reference numerals 25a, 25b, 25c, and 25c denote internal conductors. Furthermore, reference numerals 26 and 27 denote a through hole filled with a conductive agent and a second ferrite sheet, respectively. The internal conductors 25a and 25b are connected electrically by the through hole 26 filled with the conductive agent. Similarly, the internal conductors 25c and 25d are connected electrically by the through hole 26 filled with the conductive agent. No electrical connection is established between a conductive circuit 25a-26-25b and a conductive circuit 25c-26-25d. The internal conductors 25a, 25b, 25c, and 25d are connected electrically to the external electrodes 23a, 23b, 23c, and 23d shown in FIG. 7, respectively.

In the following description, a method for manufacturing the composite inductor component configured as described above is explained with reference to the appended drawings.

Figure 9A:
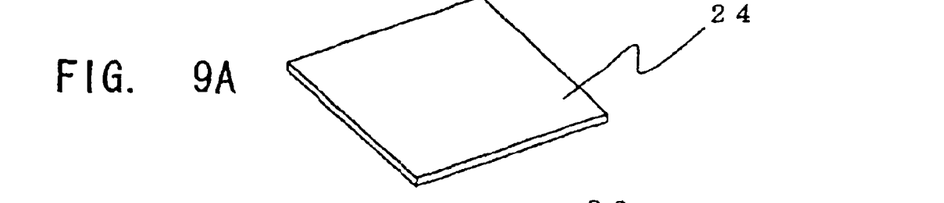
FIGS. 9A to 9E are schematic diagrams showing process steps in a method for manufacturing the composite inductor component used in Example 5 in the present invention.
Figure 9B:
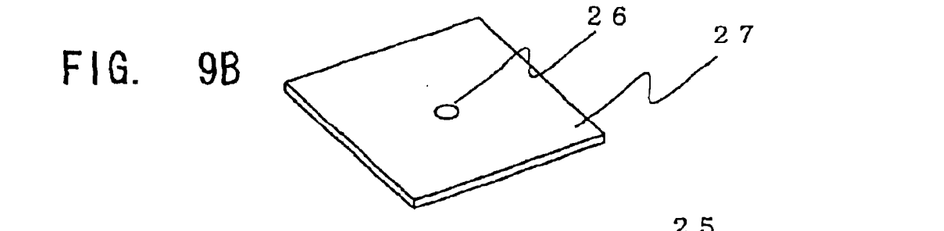
Figures 9C, 9D:
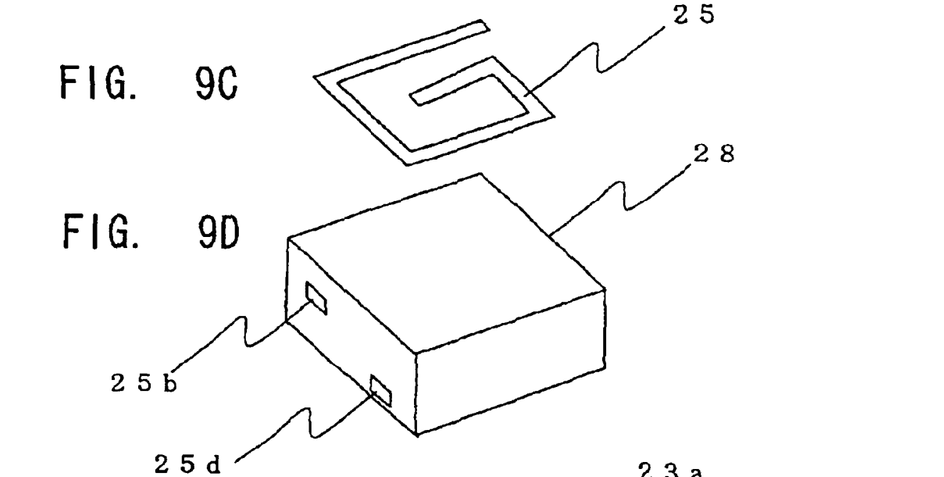
Figure 9E:
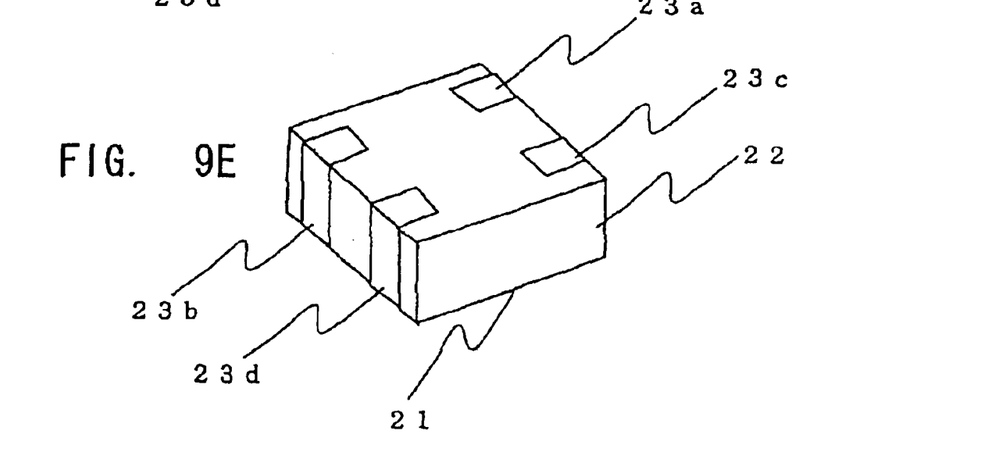

FIGS. 9A to 9E are schematic diagrams showing process steps in a method for manufacturing the composite inductor component. Initially, as shown in FIG. 9A, a plurality of first ferrite sheets 24 are manufactured by a doctor-blade method using slurry mainly containing a ferrite powder and a resin. Then, as shown in FIG. 9B, the through hole 26 is formed in a center portion of the first ferrite sheet 24 by hole-forming processing and filled with a conductive material such as Ag, and thus the second ferrite sheet 27 is manufactured. After that, as shown in FIG. 9C, the internal conductor 25 is formed by Ag paste printing or Ag plating. The internal conductor 25 is formed in the shape of an outwardly wound spiral so that an end thereof is extended to one end of the second ferrite sheet 27. The first ferrite sheet 24, the second ferrite sheet 27, and the internal conductor 25, which are manufactured in the aforementioned manner, are laminated to form a configuration shown in FIG. 8, and thus a ferrite laminated body 28 is manufactured. In this configuration, the internal conductors 25a and 25b are laminated so that inner ends of the internal conductors 25a and 25b are connected via the through hole 26 of the second ferrite sheet 27, which is filled with the conductive material. Similarly, the internal conductors 25c and 25d are laminated so that inner ends of the internal conductors 25c and 25d are connected via the through hole 26 of the second ferrite sheet, which is filled with the conductive material. No electrical connection is established between the conductive circuit 25a-26-25b and the conductive circuit 25c-26-25d. Then, a ferrite sintered body (not shown) is obtained by firing the ferrite laminated body 28 at a temperature at which Ag of the internal conductor 25 is not melted. After that, as shown in FIG. 9E, an Ag paste is applied to end faces of the ferrite sintered body so as to be connected to the internal conductors 25a, 25b, 25c, and 25d. Then, the ferrite sintered body is heat-treated to form the external electrodes 23a, 23b, 23c, and 23d. The external electrodes 23a, 23b, 23c, and 23d are processed by Ni plating followed by Sn plating, and thus the composite inductor component 21 is obtained. In the case of the composite inductor component, residual stress generated in firing between ferrite and the internal conductors causes degradation in the electrical characteristics of a finished product. Therefore, firing conditions are limited, and thus open penetrating pores 9 are formed in the ferrite sintered body.

In the composite inductor component, desired electrical characteristics can be obtained when the composite inductor component has a porosity of 2 to 30%.

Figure 10:
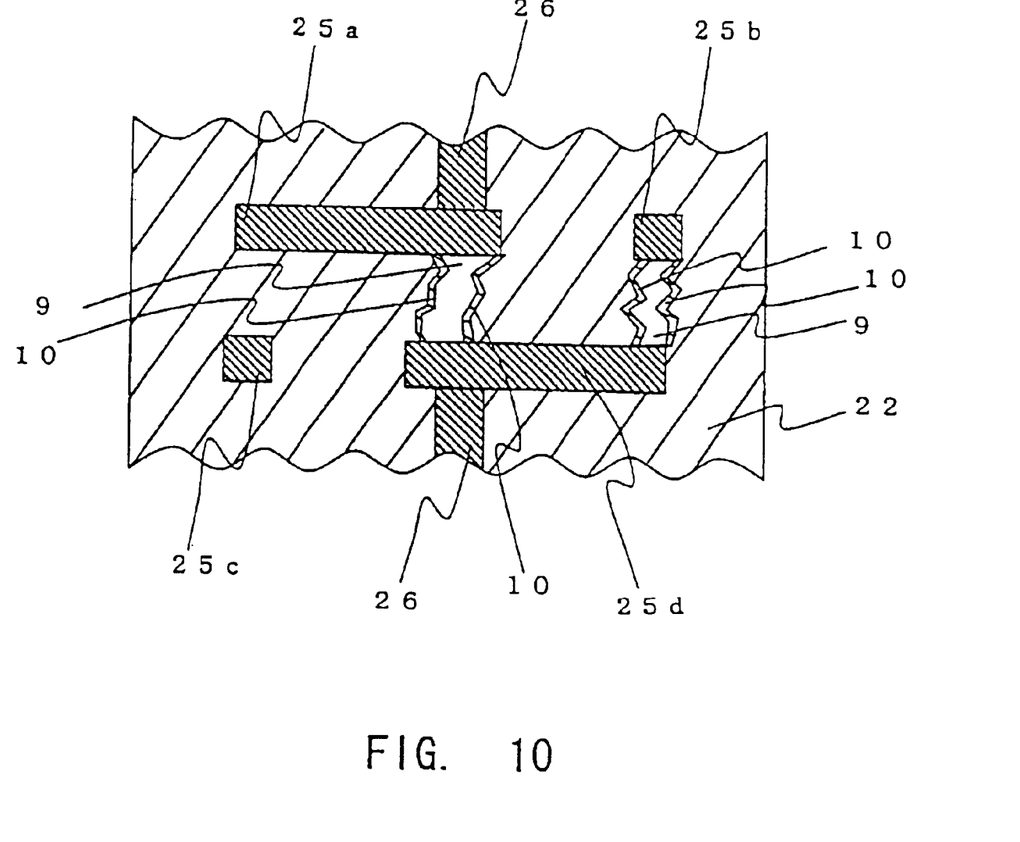
FIG. 10 is a sectional view of the composite inductor component taken on line I—I of FIG. 7.

FIG. 10 shows the composite inductor component as the ceramic electronic component according to the embodiment of the present invention, and is an expanded sectional view of a center portion of the ferrite sintered body 22 taken on line I—I of FIG. 7 showing the composite inductor component. A water repellent film 10 is formed on a ceramic surface of an open penetrating pore 9 connecting the internal inductors 25b and 25c in the ferrite sintered body 22.

In the following description, a method for forming a water repellent film of the composite inductor component shown in FIG. 10 is detailed as an example. Initially, the composite inductor component 21 and a silane coupling agent are prepared. Then, vapor impregnation is performed, so that the silane coupling agent is allowed to permeate through the open penetrating pores 9 in an inner portion of the ferrite sintered body 22. After that, the composite inductor component 21 is heat-treated after being air-dried at room temperature for several minutes, so that a condensation reaction of the silane coupling agent is accelerated. Thus, the water repellent film 10 is formed on ceramic surfaces of the open penetrating pores 9.

The following description is directed to examples in which, as shown in FIG. 10, the water repellent film 10 is formed on the ceramic surfaces of the open penetrating pores 9 between the conductive circuit 25a-26-25b and the conductive circuit 25c-26-25d.

EXAMPLE 5

A composite inductor component was subjected to a water repellent treatment in the same manner as in the water repellent treatment performed in Example 3 of Embodiment 2.

EXAMPLE 6

A composite inductor component was subjected to a water repellent treatment in the same manner as in the water repellent treatment performed in Example 4 of Embodiment 2.

COMPARATIVE EXAMPLE 6

A composite inductor component used in this example was the same as that used in Example 5. In this example, the composite component was not subjected to a water repellent treatment.

COMPARATIVE EXAMPLE 7

A composite inductor component was subjected to a water repellent treatment in the same manner as in the water repellent treatment performed in Example 1 of Embodiment 1.

For the respective composite inductor components manufactured in Examples 5 and 6, and Comparative Examples 6 and 7, thirty samples were prepared. With respect to these samples, insulation resistance between the conductive circuit 25a-26-25b and the conductive circuit 25c-26-25d was measured after a voltage of 5 V was applied between the conductive circuit 25a-26-25b and the conductive circuit 25c-26-25d for about 100 hours under an atmosphere of a temperature of 60° C. and a relative humidity of 95%. When the insulation resistance was decreased from a pre-test value of not less than $10^9$ Ω to not more than $10^4$ Ω, the insulation resistance was regarded as being degraded. The rate of the number of samples in which the insulation resistance degradation was observed is shown in Table 3.

TABLE 3

| Sample | Insulation Resistance Degradation Rate (%) |
|---|---|
| Example 5 | 0 |
| Example 6 | 0 |
| Comparative Example 6 | 43 |
| Comparative Example 7 | 30 |

As can be seen from Table 3, in Comparative Example 6 in which the water repellent treatment was not performed, the insulation resistance was degraded at a considerably high rate. In Comparative Example 7 in which the composite inductor component was processed in a simple manner such that the composite inductor component was immersed in the silane coupling solution, and an ultrasonic oscillation was applied thereto, the insulation resistance was degraded. Conceivably, this is attributable to the following. The inventors confirmed by SEM observation that a ceramic portion of the composite inductor component is denser compared with the thick film ceramic capacitor. Therefore, immersing the composite inductor component in the silane coupling solution and applying an ultrasonic oscillation thereto alone was not sufficient to allow the silane coupling solution to permeate through all the open penetrating pores in the inner portion of the ferrite sintered body, so that the water repellent film was not formed in some of the open penetrating pores.

On the contrary, in the composite inductor components subjected to a water repellent treatment by the methods employed in Examples 5 and 6, the insulation resistance was not degraded. Conceivably, in these components, the water repellent film was formed on at least a portion of the ceramic surfaces of all the open penetrating pores.

It was confirmed that the same effect could be achieved in the following components as well as in the aforementioned examples, i.e. an inductor array, a common-mode choke coil, a micro-transformer, a varistor, a semiconductive ceramic capacitor, a ceramic thermistor, and a ceramic electronic substrate housing these components.

INDUSTRIAL APPLICABILITY

As discussed in the foregoing description, the present invention is to provide a ceramic electronic component and a method for manufacturing the ceramic electronic component. The ceramic electronic component prevents a conductive path from being formed by water obtained as a result of capillary condensation by forming a water repellent film between electrodes, thereby preventing the occurrence of ion migration resulting from the formation of the conductive path, so that insulation resistance is not degraded even under high humidity.

What is claimed is:

1. A ceramic electronic component, comprising:
   first and second electrodes spaced from each other, the first and second electrodes being insulated from each other, a difference in potential being generated between the first and second electrodes during operation of the component, a void that penetrates to the outside of the component being provided, and
   a water repellent film is-formed in the void.

2. The ceramic electronic component according to claim 1, wherein the formation of an electrical path is prevented by the water repellent film.

3. The ceramic electronic component according to claim 1, wherein the void is at least one selected from a minute hole and a defect.

4. The ceramic electronic component according to claim 2, wherein the water repellent film in said void is present only between the first and second electrodes.

5. The ceramic electronic component according to claim 1, wherein the water repellent film is formed of a residue resulting from a molecule of a coupling agent and has such a thickness as not to narrow the void by not less than 1 nm.

6. The ceramic electronic component according to claim 5, wherein the molecule of the coupling agent is bonded to a ceramic base material by a covalent bond.

7. The ceramic electronic component according to claim 5, wherein the molecule of the coupling agent has a portion containing a fluoroalkyl group.

8. The ceramic electronic component according to claim 7, wherein the molecule of the coupling agent containing the fluoroalkyl group is a residue of perfluoroalkyl alkylsilane represented by the following general formula (Chemical Formula 1):

$$CF_3-(CF_2)_n-Si(O-)_3 \quad \text{(Chemical Formula 1)}$$

(n: 0 or an integer, R: a substituent containing an alkylene group, or a Si or oxygen atom).

9. The ceramic electronic component according to claim 7, wherein the molecule of the coupling agent containing the fluoroalkyl group is polymerized.

10. The ceramic electronic component according to claim 1, wherein ceramic is formed by at least one selected from the group consisting of sintering after printing, sintering after sheet forming, vapor deposition, and sputtering.

11. The ceramic electronic component according to claim 1, wherein the first and second electrodes are buried in an inner portion of ceramic or integrated on the surface.

12. The ceramic electronic component according to claim 1, wherein the electronic component is a thick film ceramic electronic component including a ceramic layer and the first and second electrodes, the ceramic layer being formed as a thick film on a base material.

13. The ceramic electronic component according to claim 1, wherein the electronic component is a composite inductor component including a ceramic sintered body and at least two conductive circuits.

14. The ceramic electronic component according to claim 13, wherein the composite inductor component has a porosity ranging from not less than 2% to not more than 30%.

15. The ceramic electronic component according to claim 1, wherein the electronic component is at least one selected from the group consisting of a multilayer ceramic capacitor, a varistor, a semiconductive ceramic capacitor, a ceramic thermistor, an inductor array, a common-mode choke coil, a micro-transformer, and a ceramic electronic substrate housing a ceramic electronic function unit including two or more electrodes between which a potential difference is produced in operation.

* * * * *

UNITED STATES PATENT AND TRADEMARK OFFICE
CERTIFICATE OF CORRECTION

PATENT NO. : 6,876,537 B2
DATED : April 5, 2005
INVENTOR(S) : Takahara et al.

It is certified that error appears in the above-identified patent and that said Letters Patent is hereby corrected as shown below:

Column 14,
Line 51, "film is formed" should read -- film formed --.

Signed and Sealed this

Eighth Day of November, 2005

JON W. DUDAS
*Director of the United States Patent and Trademark Office*